United States Patent
Martini et al.

(10) Patent No.: US 9,195,669 B2
(45) Date of Patent: Nov. 24, 2015

(54) DETECTING AND MANAGING ABNORMAL DATA BEHAVIOR

(71) Applicant: Phantom Technologies, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/191,346

(22) Filed: Feb. 26, 2014

(65) Prior Publication Data

US 2015/0242415 A1    Aug. 27, 2015

(51) Int. Cl.
 *G06F 17/30* (2006.01)
(52) U.S. Cl.
 CPC ................................ *G06F 17/30082* (2013.01)
(58) Field of Classification Search
 CPC .................................. G06F 17/30; G06F 17/00
 See application file for complete search history.

(56) References Cited

U.S. PATENT DOCUMENTS

| | | | | |
|---|---|---|---|---|
| 5,666,157 | A * | 9/1997 | Aviv | 348/152 |
| 6,550,057 | B1 * | 4/2003 | Bowman-Amuah | 717/126 |
| 7,349,894 | B2 * | 3/2008 | Barth et al. | 1/1 |
| 7,483,883 | B2 * | 1/2009 | Barth et al. | 1/1 |
| 7,627,606 | B2 * | 12/2009 | Barth | 705/26.41 |
| 7,774,331 | B2 * | 8/2010 | Barth et al. | 707/706 |
| 8,458,162 | B2 * | 6/2013 | Barth et al. | 707/706 |
| 8,645,535 | B1 * | 2/2014 | Martini | 709/224 |
| 8,738,599 | B2 * | 5/2014 | Barth et al. | 707/706 |
| 8,782,087 | B2 * | 7/2014 | Sengupta et al. | 707/791 |
| 8,843,481 | B1 * | 9/2014 | Xu | 707/732 |
| 2001/0054020 | A1 * | 12/2001 | Barth et al. | 705/37 |
| 2005/0010567 | A1 * | 1/2005 | Barth et al. | 707/3 |
| 2005/0203881 | A1 * | 9/2005 | Sakamoto et al. | 707/3 |
| 2005/0234853 | A1 * | 10/2005 | Barth et al. | 707/1 |
| 2005/0251497 | A1 * | 11/2005 | Barth et al. | 707/1 |

(Continued)

FOREIGN PATENT DOCUMENTS

WO    WO03/055148    7/2003

OTHER PUBLICATIONS

Maybury, Mark, et al., "Analysis and Detection of Malicious Insiders," 2005, ACM, International Conference on Intelligence Analysis, pp. 1-7.*

(Continued)

*Primary Examiner* — Farhan Syed
(74) *Attorney, Agent, or Firm* — Fish & Richardson P.C.

(57) ABSTRACT

Methods and systems for providing destination-specific network management are described. One example method includes determining a normal data movement profile for a computing device based on observed normal data transfer behavior by the computing device; identifying a data movement rule associated with the computing device, the data movement rule including a deviation amount, and one or more actions to take when the computing device deviates from the normal data movement profile by more than the deviation amount; detecting a data movement associated with the computing device; determining that the detected data movement exceeds the deviation amount included in the data movement rule relative to the normal data movement profile for the computing device; and performing the one or more actions associated with the data movement rule upon determining that the data movement violates the data movement rule.

19 Claims, 4 Drawing Sheets

(56) References Cited

U.S. PATENT DOCUMENTS

| | | | |
|---|---|---|---|
| 2005/0262064 A1* | 11/2005 | Lavin | 707/3 |
| 2005/0262065 A1* | 11/2005 | Barth et al. | 707/3 |
| 2006/0037077 A1 | 2/2006 | Gadde | |
| 2006/0080297 A1* | 4/2006 | Barth | 707/3 |
| 2006/0080298 A1* | 4/2006 | Kelly et al. | 707/3 |
| 2006/0123012 A1* | 6/2006 | Barth | 707/10 |
| 2007/0174501 A1 | 7/2007 | Lin et al. | |
| 2008/0033770 A1* | 2/2008 | Barth et al. | 705/5 |
| 2008/0177994 A1* | 7/2008 | Mayer | 713/2 |
| 2010/0124196 A1 | 5/2010 | Bonar et al. | |
| 2010/0268623 A1* | 10/2010 | Barth et al. | 705/27 |
| 2011/0219035 A1* | 9/2011 | Korsunsky et al. | 707/784 |
| 2011/0270872 A1* | 11/2011 | Alvarez et al. | 707/769 |
| 2012/0053959 A1* | 3/2012 | Sengupta et al. | 705/2 |
| 2012/0179578 A1* | 7/2012 | Barth et al. | 705/26.62 |
| 2012/0304007 A1* | 11/2012 | Hanks et al. | 714/26 |
| 2013/0097701 A1 | 4/2013 | Moyle | |
| 2013/0124638 A1* | 5/2013 | Barreto et al. | 709/205 |
| 2013/0246103 A1* | 9/2013 | Barth et al. | 705/5 |
| 2013/0290359 A1* | 10/2013 | Eronen et al. | 707/758 |
| 2014/0034456 A1* | 2/2014 | GEHRING et al. | 198/810.01 |
| 2014/0258187 A1* | 9/2014 | Suleiman et al. | 706/12 |
| 2014/0324787 A1* | 10/2014 | Sengupta et al. | 707/690 |

OTHER PUBLICATIONS

Kachirski, Oleg, et al., "Intrusion Detection Using Mobile Agents in Wireless Ad Hoc Networks," 2002, Proceedings of the IEEE Workshop on Knowledge Media Networking, pp. 1-6 (6 total pages).*

Kachirski, Oleg, et al., "Effective Intrusion Detection Using Multiple Sensors in Wireless Ad Hoc Networks," 2003, IEEE, Proceedings of the 36th Hawaii International Conference on System Sciences, pp. 1-8 (8 total pages).*

Ghosh, Anup, et al., "Learning Program Behavior Profiles for Intrusion Detection," 1999, USENIX, Proceedings of the Workshop on Intrusion Detection and Network Monitoring, pp. 1-13 (13 total pages).*

Zhang, Yongguang, and Wenke Lee. "Intrusion detection in wireless ad-hoc networks." In Proceedings of the 6th annual international conference on Mobile computing and networking, pp. 275-283. ACM, 2000.*

Zhang, Yongguang, Wenke Lee, and Yi-An Huang. "Intrusion detection techniques for mobile wireless networks." Wireless Networks 9, No. 5 (2003): 545-556.*

Garuba, Moses, Chunmei Liu, and Duane Fraites. "Intrusion techniques: Comparative study of network intrusion detection systems." In Information Technology: New Generations, 2008. ITNG 2008. Fifth International Conference on, pp. 592-598. IEEE, 2008.*

Riveiro, Maria, Göran Falkman, Tom Ziemke, and Håkan Warston. "VISAD: an interactive and visual analytical tool for the detection of behavioral anomalies in maritime traffic data." In SPIE Defense, Security, and Sensing, pp. 734607-734607. International Society for Optics and Photonics, 2009.*

Sun, Bo, Yang Xiao, and Ruhai Wang. "Detection of fraudulent usage in wireless networks." Vehicular Technology, IEEE Transactions on 56, No. 6 (2007): 3912-3923.*

Roshandel, Roshanak, Payman Arabshahi, and Radha Poovendran. "LIDAR: a layered intrusion detection and remediationframework for smartphones." In Proceedings of the 4th international ACM Sigsoft symposium on Architecting critical systems, pp. 27-32. ACM, 2013.*

International Search report in corresponding PCT application No. PCT/US2015/017735 dated Jun. 5, 2015, 10 pages.

* cited by examiner

DETECTING AND MANAGING ABNORMAL DATA BEHAVIOR

BACKGROUND

This specification generally relates to detecting and managing abnormal data behavior.

In corporate and other networks, computers connected to an internal network may send data to destinations connected to wider, public networks such as the Internet. In such a configuration, data loss may occur when data is transferred from the computers to an unauthorized destination. For example, malicious code may be installed on a computer and used to send data originating within the network over the public network to a remote, and sometimes undesirable, destination. In some cases, the data may be encrypted prior to sending, making it difficult or impossible to examine the contents of the data as it is being transmitted.

SUMMARY

In general, one aspect of the subject matter described in this specification may be embodied in systems, and methods performed by data processing apparatuses that include the actions of determining a normal data movement profile for a computing device based on observed normal data transfer behavior by the computing device; identifying a data movement rule associated with the computing device, the data movement rule including a deviation amount, and one or more actions to take when the computing device deviates from the normal data movement profile by more than the deviation amount; detecting a data movement associated with the computing device; determining that the detected data movement exceeds the deviation amount included in the data movement rule relative to the normal data movement profile for the computing device; and performing the one or more actions associated with the data movement rule upon determining that the data movement violates the data movement rule.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
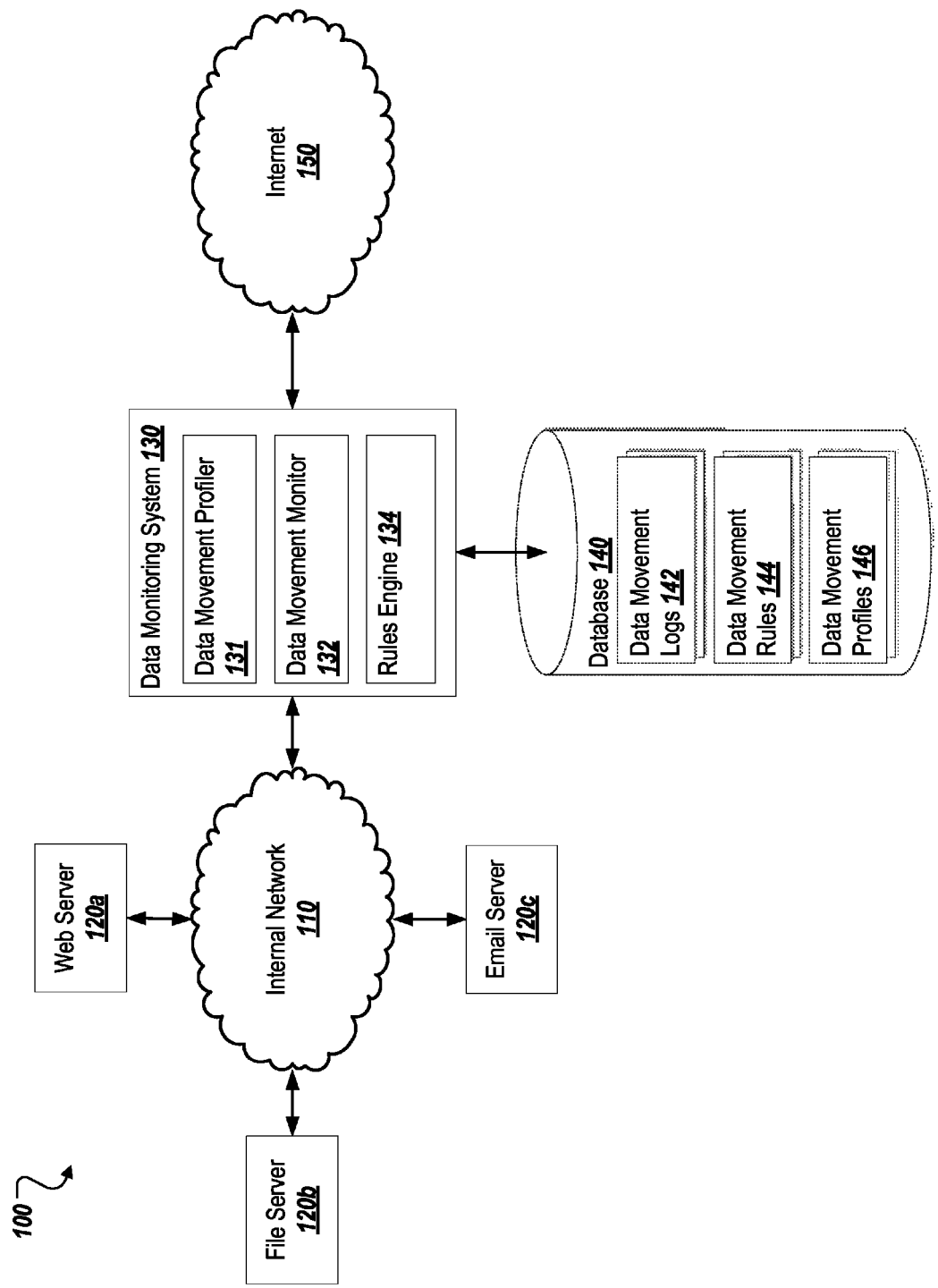
FIG. 1 is a diagram of an example environment.

Data loss in a network may occur when data is sent from a computer on the network to an unauthorized or otherwise undesirable destination. For example, an unauthorized program running on a computer may access private data and send the data to a destination outside the network. In another example, a hacker may gain access to the network and attempt to extract private data from computers on the network. In some cases, such unauthorized data movement may be identified based on the destination to which the data is transferred. For example, if a computer that ordinarily should only be sending data to North America suddenly performs a large transfer to another destination outside North America, this may be indicative of improper data transfer, or more generally, data loss.

One challenge in detecting such data loss is determining which data movements represent data loss and which data movements represent normal data behavior for a particular computer on the network. One approach involves manually entering acceptable parameters representing normal data transfer behavior for each computer on the network. However, for large networks including large numbers of computers, each with potentially different parameters describing normal data behavior for that computer, such an approach may become labor intensive, error prone, and inefficient.

The present disclosure describes various techniques for automatically creating a normal data movement profile for a computer representing normal data behavior for that particular computer based on observed data movement behavior for the particular computer. Rules may be defined specifying acceptable deviation amounts from the normal data movement profile for the particular computer. If a data movement is determined to violate one of these rules by causing a deviation from the normal data movement profile greater than the acceptable deviation amount, one or more actions associated with the rule may be performed.

For example, the solution may be configured with a rule stating that a particular computer should be quarantined (e.g., isolated from the public network, and thus not allowed to transmit data to destinations outside the local area network in which the computer resides) if the data movement to Country X deviates from normal by more than 10%. The particular computer may have a normal data movement profile indicating that 1 gigabyte of outbound network traffic to Country X over a period of an hour represents normal data movement behavior. The solution may then monitor data movement from the computer to Country X, and keep a running total of the amount of data transferred from the computer. If the running total exceeds 1.1 gigabytes (1 gigabyte plus 10%) within an hour, the computer may be quarantined (e.g., disconnected from the network to disable all transfers, or, alternatively, only outbound transfers). In some implementations, quarantining a computer may include only severing connections from the computer to the destination associated with the unauthorized transfer, or otherwise limiting the computer's network access to that destination. In some cases, the solution may be configured to perform additional actions, such as alerting a network administrator to the unauthorized transfer, either instead of or in addition to quarantining the computer.

In some implementations, the solution may perform data movement monitoring by examining network traffic flowing from an internal network (such as a local area network (LAN) to which the monitored servers are connected) to a public network such as the Internet. The solution may be placed in the data path, or may indirectly monitor network activity such as in a tap or span configuration. The solution may maintain and update data movement statistics for all the servers connected to the internal network, and may perform actions on the servers when unauthorized data movement violating the data movement rules is detected. In some implementations, the destination to which data movement is occurring is determined by geo-locating an address (e.g., an IP address) or other identifier associated with the destination.

In some implementations, the solution may also monitor and control data movement between multiple internal networks. For example, a network owner may wish to monitor all data movement occurring from a research and development (R&D) LAN to other LANs within the company, and quarantine a computer on the R&D LAN if a large transfer is detected, as such a transfer may be indicative of potentially significant data loss.

The techniques described herein may provide several potential advantages. First, unauthorized data movement, and thus data loss, may be detected and prevented, or at least mitigated, automatically. By determining normal data behavior based on observed network usage, time consuming and error prone manual entry of behavior parameters may be avoided. Additionally, the present solution allows network administrators to apply different rules to different servers or sets of servers. For example, an administrator might configure a first rule to quarantine one computer if a deviation from its normal data movement profile of 10% or more is detected, and configure a second rule to quarantine another computer if a deviation from its normal data movement profile of 20% or more is detected. This flexibility allows the network administrator to more efficiently manage the network. Further, by applying security measures based on the volume of data movement rather than the content of the data being moved, encrypted data movement may be monitored and controlled even without encrypting and inspecting the encrypted data in question. The normal data movement profiles may also represent many different types of data movement behavior, allowing more sophisticated detection of threats.

FIG. 1 is a diagram of an example environment 100 in which various aspects of the subject matter described here may be implemented. The environment includes an internal network 110 separated from the Internet 150 by a data monitoring system 130. One or more servers 120a-c are connected to the internal network 110. A database 140 including data movement logs 142, data movement rules 144, and data movement profiles 146 is communicatively coupled to the data monitoring system 130. The Internet 150 connects the internal network 110 to various destinations, including destinations 160 and 170 shown in FIG. 1.

In one example implementation, data moving from one of the servers 120a-c is detected by the data monitoring system 130. In some cases, the data flows through the data monitoring system 130, much like a proxy server or gateway configuration. The data movement may also be detected indirectly by the data monitoring system 130, such that the system need not be in the data path (e.g., a tap or span configuration). The data monitoring system 130 observes the data movements on the network 110, and analyzes the movements to create data movement profiles 146 associated with the server 120a-c. When data movement is detected, the data monitoring system 130 determines whether the movement violates the one or more data movement rules 144 stored or otherwise maintained in the database 140. The data movement rules 144 may specify one or more deviation amounts from the data movement profile. If a particular data movement, either alone or in aggregation with other observed movements, causes a deviation from the data movement profile greater than the deviation amount defined in a rule, one or more actions are performed. For example, a data movement rule may state that a deviation of greater than 10% from a data movement profile will cause the network access of web server 120a to be completely severed for a period of time, either entirely (i.e., both inbound and outbound traffic) or selectively (e.g., only outbound traffic). This type of action may be referred to as "quarantining" the web server 120a. Particulars of the data movement rules 144 are discussed below.

In some implementations, determining the destination of data movements is performed by geo-locating the destination IP address to which the data movement is occurring. Data movement rules may apply to a geographic region, such as a country, city or other locality, or to a set of such destinations. The data movement profiles, likewise, may define normal data behaviors for a particular computer to different geographic regions. In some cases, determining the destination may include comparing the destination IP address to which the data is moving to a list or range of IP addresses to which the data movement rule applies.

As shown FIG. 1, the environment 100 includes an internal network 110. In some implementations, the internal network 110 may be an IP network to which the one or more servers 120a-c are connected. The internal network 110 may be separated from the Internet 150 by one or more firewalls, proxy servers, and/or the data monitoring system 130.

The internal network 110 may include one or more servers 120a-c. In some implementations, the one or more servers may include servers of different types, such as, for example, a web server 120a, a file server 120b, and an email server 120c. Each of the one or more servers may be specifically designed to perform tasks associated with its type, or the servers may each be general-purpose machines that have been configured to the associated type. For example, the web server 120a may be a general-purpose server that has been configured with web server software to function as a web server.

In some implementations, the one or more servers 120a-c are configured to receive requests from the Internet 150 and respond to those requests. For example, the web server 120a may be configured to receive requests formatted according to the HyperText Transfer Protocol (HTTP) and respond with webpages associated with the Uniform Resource Locator (URL) or URLs in the request. These requests and their associated responses may be monitored by the data monitoring system 130, as described below.

The illustrated environment 100 also includes a data monitoring system 130. In some implementations, the data monitoring system 130 is a server connected to the internal network 110 that acts as a gateway between the internal network 110 and the Internet 150. In such a configuration, all network traffic to and from the one or more servers 120a-c passes through the data monitoring system 130. The data monitoring system 130 may function as a proxy server in such a configuration. The data monitoring system 130 may also analyze data being sent to and from the one or more servers 120a-c.

The data monitoring system 130 may also be arranged in a tap or span configuration, such that data from the internal network 110 does not flow through it, but instead the data monitoring system 130 monitors the data passively, such as by receiving notifications from another component of data transfers.

The data monitoring system 130 includes a data movement profiler 131. In operation, the data movement profiler 131 observes the data movement behavior of the one or more servers 120a-c and creates data movement profiles 146 associated with the one or more servers 120a-c. In some cases, the data movement profiler 131 may observe data movements to and from the one or more servers 120a-c and determine normal values for various metrics, such as, for example, data throughput, number of destinations, transfer rate, number of traffic types, number of inbound or outbound connections, or other metrics. In some implementations, the data movement profiler 131 may determine these normal values by performing different types of analysis on the observed data movements, such as, for example, statistical analysis, historical analysis, or other types of analysis. The data to the profiler 131 may continuously update the data movement profiles 146 as new network activity is observed, such that the data movement profiles 146 represent a current indication of normal data movement behavior for each of the one or more servers 120a-c.

In some cases, the data movement profiler 131 may observe network traffic in real time in order to create and maintain the data movement profiles 146. The date of the profiler 131 may perform this monitoring, or may interface with the data movement monitor 132 (described below) to perform this monitoring. The data movement profiler 131 may also perform data mining on the data movement logs 142 stored in the database 140 to create and maintain the data movement profiles 146.

The data monitoring system 130 includes a data movement monitor 132. The data movement monitor 132 may identify data movements occurring between the one or more servers 120a-c and various destinations connected to the Internet 150. In some implementations, the data movement monitor 132 may determine a geographic location associated with a destination to which data is moving. The data movement monitor 132 may make this determination by geo-locating an IP address associated with the destination. In some cases, the destination may be determined by comparing a destination IP address to a stored range of IP addresses. For example, IP addresses with a first octet of "155" may belong to a competitor of the owner of the internal network 110, and thus may be identified in the database and have data movement rules associated with them. In some implementations, these IP address ranges may be specified using a mask notation, such that the above range would be defined as "155.255.255.255." In some implementations, the data movement monitor 132 may store identified data movements in the database 140, such as in the data movement logs 142. These features are discussed in greater detail below.

As shown, the data monitoring system 130 includes a rules engine 134. In some implementations, the rules engine 134 may determine whether a certain data movement event from the one or more servers 120a-c violates the one or more data movement rules 144 stored in the database 140. For example, if a data movement event is detected from the web server 120a to a particular destination, the rules engine 134 may determine that this data movement violates one of the data movement rules 144, such as, for example, by deviating from the data movement profile 146 associated with the web server 120a. If the rules engine 134 determines that the data movement violates one of the data movement rules 144, the rules engine 134 may perform the one or more actions associated with the data movement rule that was violated. For example, if the data movement rule associated with the data movement profile 146 for web server 120a has an associated action indicating that the offending server should be quarantined, the rules engine 134 would quarantine the web server 120a in response to the rule being violated.

The data monitoring system 130 is connected to a database 140. In some implementations, the database 140 is stored on the same server as the data monitoring system 130. The database 140 may also be stored on a separate server and accessed by the data monitoring system 130 over a network. The database 140 may be any proprietary or commercially available database system or format, including, but not limited to, MySQL®, Microsoft® SQLServer, IBM® DB2, Oracle®, SQLite, or any other suitable database system or format. The database 140 may also be a distributed database running on a plurality of servers. In some implementations, the database 140 may be a configuration file or set of configuration files associated with the data monitoring system 130. The data monitoring system 130 may examine these configuration files to determine the currently configured rules and associated actions.

The database 140 includes a set of data movement logs 142. In some instances, the data movement logs 142 include a historical record of data movement from the one or more servers 120a-c. For example, a data transfer from the web server 120a and to particular destination may be represented in the data movement logs 142 as a series of records indicating various amounts of data being transferred. Each record may indicate a certain number of packets or other amount of data transferred in an amount of time. In some implementations, the rules engine 134 may examine the data movement logs 142 to determine whether a detected data movement, in addition to past data movements, violates one or more of the data movement rules 144.

The database 140 also includes a set of data movement rules 144. In some implementations, the data movement rules 144 may specify conditions that, when met, will cause one or more associated actions to occur. For example, the data movement rule may specify that when the amount of data transferred outbound from web server 120a deviates from the data movement profile 146 by greater than 10%, the server should be quarantined for five minutes and an administrator should be alerted. The data movement rules 144 may be stored in a table or tables within the database, and may be stored in any suitable format. In some implementations, a single data movement rule may apply to a set including multiple servers. In such cases, the data movement rule, such as the violation conditions and the actions to be taken upon violation, may be configured in one table and may be assigned to the different servers in a second table. For example, a data movement rule stating that deviations from the data movement profiles of more than 10% are violations may be assigned to multiple servers. In such a case, the data movement rule would be applied differently to the different servers, as the data movement profiles for each server will include different normal values for that server, meaning that a data movement that is a violation for one server may be normal for another.

The database 140 includes a set of data movement profiles 146. The data movement profiles 146 include representations of normal data movement behavior for the one or more servers 120a-c. In some implementations, each data movement profile 146 is associated with one of the one or more servers 120a-c. In some cases, a single data movement profile 146 may apply to a plurality of the one or more servers 120a-c.

Each data movement profile 146 describes various aspects of a normal or expected data movement behavior associated with a particular server. The data movement profile 146 may include a collection of normal values for various metrics associated with data movements, such as, for example, data throughput, number of destinations, transfer rate, number of traffic types, number of inbound or outbound connections, or other metrics. In some implementations, the data movement profile 146 may include sets of metrics associated with different types of traffic, such as, for example, metrics for different destinations (e.g., geographic regions, IP address blocks, domains, etc.), different network protocols (e.g., HTTP, TCP, FTP, etc.), different applications (e.g., BitTorrent, ToR, etc.), or other types of traffic.

The data monitoring system 130 is connected to the Internet 150. In some implementations, the Internet 150 is the public Internet. The Internet 150 may also be any network or combination of networks accessible from the internal network 110. In such an implementation, the Internet 150 may be replaced by another network or combination of networks, which may be public, private, or a combination of the two. In some implementations, the Internet 150 is a distributed network utilizing the Transmission Control Protocol (TCP) in combination with HTTP to transmit requests to servers connected to the Internet 150, and to transmit responses from the servers to the requesting clients.

Figure 2:
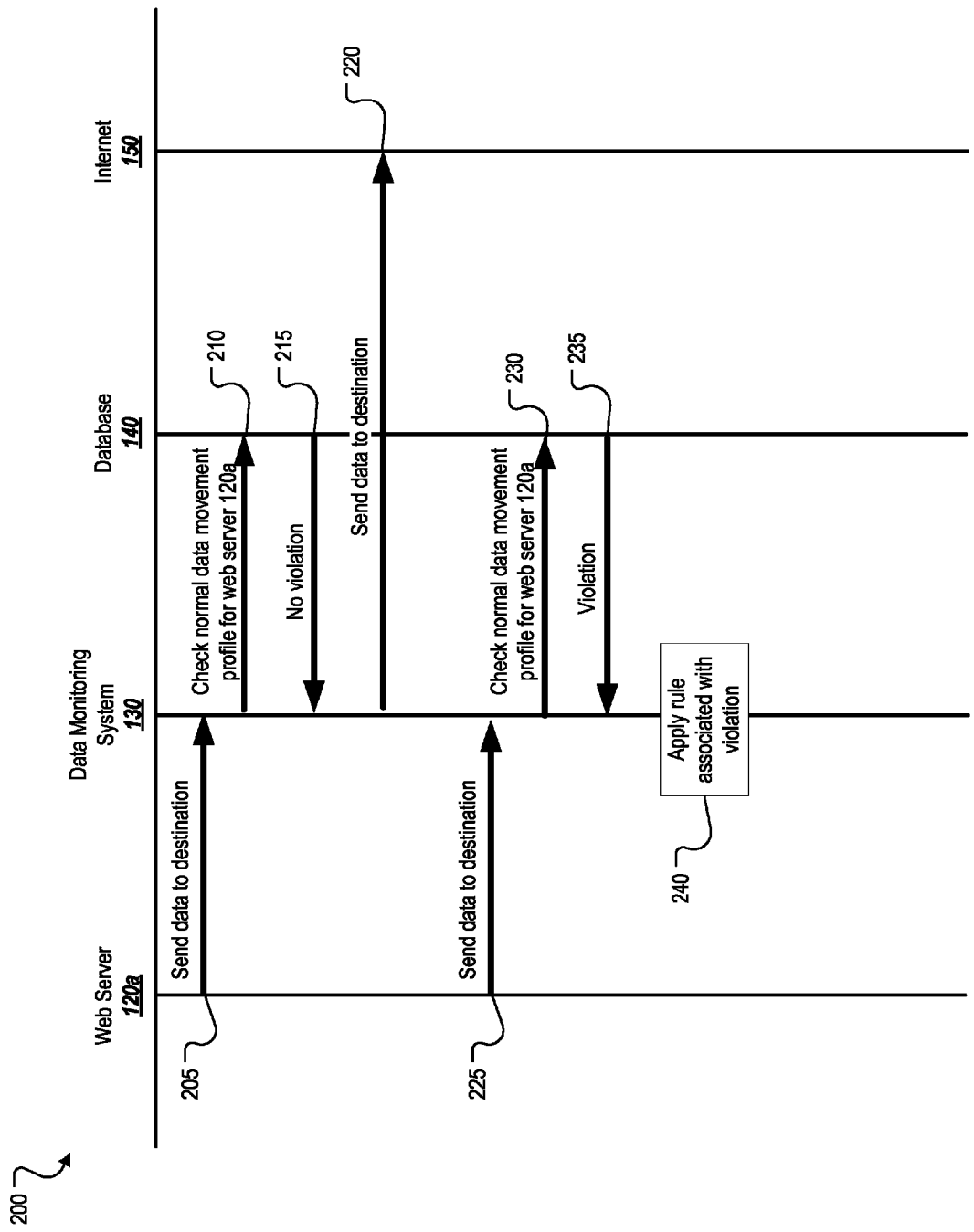
FIG. 2 is a message flow diagram of an example interaction between the components of the example network to detect and manage abnormal data behavior.

FIG. 2 is a message flow diagram of an example interaction 200 between the components of the example network to destination-specific server management. In some implementations, the interaction 200 may include additional and/or different components not shown in the message flow diagram. Components may also be omitted from the interaction 200, and additional messages may be added to the interaction 200.

At 205, the web server 120a attempts to send data to a destination via the Internet 150. The data is received by the data monitoring system 130. In a tap or span implementation, the data may be observed by the data monitoring system 130 as it is being transferred to the destination. In some implementations, the data sent at 205 may be in response to a request received by the web server 120a. For example, the web server 120a may send an HTTP "200 OK" message including the contents of a webpage in response to an HTTP GET message received from the destination.

At 210, the data monitoring system 130 checks the data movement profile for web server 120a to determine if a violation has occurred. In some cases, the data monitoring system 130 may perform a query or set of queries on the database 140 to determine whether the data sent at 205 is in violation of a data movement role associated with the data movement profile for the Web server 120a. At 215, the database 140 returns a result indicating that no violation has occurred.

In some implementations, the data monitoring system 130 may query the database 140 for the data movement profile associated with the Web server 120A, and any data movement rules associated with the data movement profile. The data monitoring system 130 may analyze the data movement profile in the data movement rules determine whether the data sent by the web server 120a at 205 indicates deviation from the data movement profile associated with the Web server 120 a. For example, data monitoring system 130 may determine whether the data sent at 205 cause any of the metrics in the data movement profile to deviate from the normal values by more than the deviation percentage associated with the data movement rule.

At 220, the data monitoring system 130 forwards the data sent by the web server 120a at 205 to the Internet 150 for delivery to the requested destination. Additional responses received from the destination destined for the web server 120a may be received by the data monitoring system 130 and forwarded to the web server 120a. These steps are not shown in FIG. 2.

At 225, the web server 120a attempts to again send data to a destination via the Internet 150. In the illustrated implementation, the data is received by the data monitoring system 130. In a tap or span implementation, the data may be observed by the data monitoring system 130 as it is being transferred. In some implementations, the data sent at 225 may be in response to a request received by the web server 120a. For example, the web server 120a may send an HTTP "200 OK" message including the contents of a webpage in response to an HTTP GET message received from the destination.

At 230, the data monitoring system 130 checks the data movement profile for web server 120a to determine if a violation has occurred. This selection may be performed according to the mechanisms described previously relative to 210.

At 235, the database 140 returns a result indicating that a violation has occurred. In some cases, the database 140 may return the rule that has been violated with the indication, including any actions associated with the rule. At 240, the rule associated with the violation is applied by performing one or more actions associated with the rule on the web server 120a (e.g., quarantining, severing outbound connections, etc.).

Figure 3:
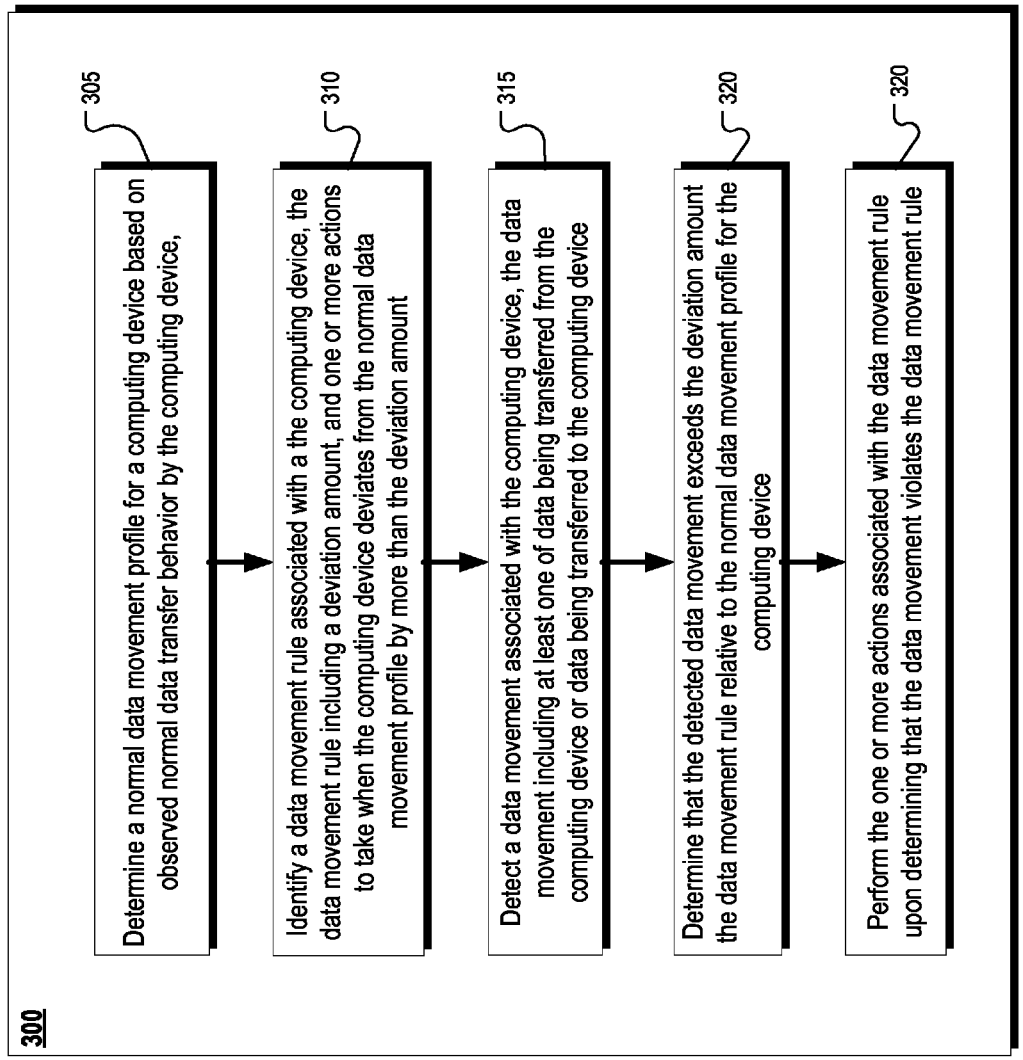
FIG. 3 is a flow chart of an example process of detecting and managing abnormal data behavior.

FIG. 3 is a flow chart of an example process 300 of detecting and managing abnormal data behavior. At 305, a normal data movement profile is determined for a computing device based on observed normal data transfer behavior over a network by the computing device.

At 310, a data movement rule associated with the computing device. The data movement rule includes a deviation amount and one or more actions to take when the computing device deviates from the normal data movement profile by more than the deviation amount. In some cases, the one or more actions associated with the data movement rule include one or more of disabling the computing device for an amount of time, or alerting an administrator of the data movement.

At 315, a data movement associated with the computing device is detected, the data movement including at least one of data being transferred from the computing device or data being transferred to the computing device. In some cases, detecting the data movement includes determining an amount of data being moved and determining the destination to which the data is being moved. Determining the destination to which the data is being moved may include geo-locating an IP address to which the data is being moved. In some cases, the data movement may occur from a private network to a public network. The data movement may occur from a first private network to a second private network.

At 320, a determination is made that the detected data movement exceeds the deviation amount the data movement rule relative to the normal data movement profile for the computing device. This determination may be made according to the techniques previously described relative to FIGS. 1 and 2. At 325, the one or more actions associated with the data movement rule are performed upon determining that the data movement violates the data movement rule.

In some implementations, the normal data movement profile includes a normal amount of data transferred, the deviation amount specifies a percentage deviation from the normal amount of data transferred that will trigger the data movement rule, and determining that the data movement violates the data movement rule comprises determining that an amount of data associated with the data movement is greater than the normal amount of data transferred by more than the deviation amount.

In some cases, the normal data movement profile includes a normal data transfer type distribution, the deviation amount specifies a percentage deviation from the normal data transfer type distribution that will trigger the data movement rule, and determining that the data movement violates the data movement rule comprises determining that an observed data transfer type distribution associated with the data movement differs from the normal data transfer type distribution by more than the deviation amount. The normal data transfer type distribution may include a ratio of Universal Datagram Protocol (UDP) transfers to Transmission Control Protocol (TCP) transfers. The normal data transfer type distribution may also include one or more ratios between different protocols, data types, applications, or other data movement attributes.

In some cases, the normal data movement profile includes a normal number of simultaneous data destinations, the deviation amount specifies a percentage deviation from the normal number of simultaneous data destinations transferred that will trigger the data movement rule, and determining that the data movement violates the data movement rule includes determining that a number of simultaneous data destinations for the computing device is greater than the normal number of simultaneous data destinations by more than the deviation amount.

In some implementations, the normal data movement profile includes a normal data rate, the deviation amount specifies a percentage deviation from the normal data rate that will trigger the data movement rule, and determining that the data movement violates the data movement rule includes determining that a data rate for the computing device is greater than the normal data rate by more than the deviation amount.

Figure 4:
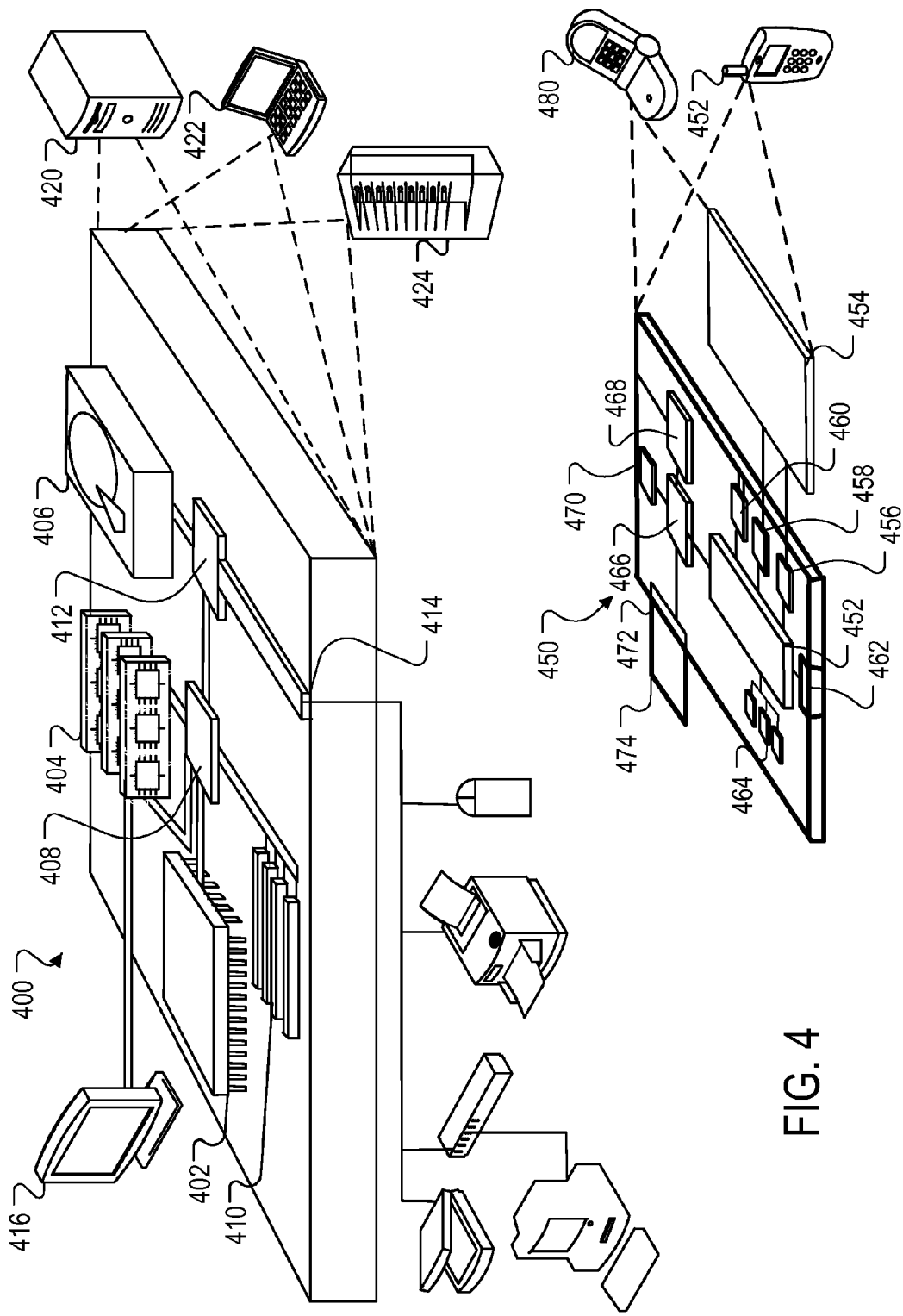
FIG. 4 is a diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 452 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by one or more processors, the method comprising:

determining a normal data movement profile for a particular computing device representing observed data transfer behavior over a network by the particular computing device during a particular time period, the observed data transfer behavior including messages sent and received by the particular computing device over the network monitored by a computing device different than the particular computing device, the normal data movement profile including one or more normal data movement attributes associated with the particular computing device, wherein the normal data movement attributes include values representing observed amounts of data sent and received by the computing device over the network during the particular time period;

identifying a data movement rule associated with the particular computing device, the data movement rule including a deviation amount representing a difference between an attribute of a detected data movement by the particular computing device and a corresponding normal movement attribute including a normal data movement profile for the particular computing device that represents a violation of the data movement rule, and one or more actions to take when the particular computing device deviates from the normal data movement profile by more than the deviation amount;

detecting a data movement associated with the particular computing device;

determining that the detected data movement exceeds the deviation amount included in the data movement rule relative to the normal data movement profile for the particular computing device; and performing the one or more actions associated with the data movement rule upon determining that the data movement violates the data movement rule, wherein the one or more actions include at least one of quarantining the particular computing device, generating an alert indicating that the particular computing device has violated the data movement rule, severing one or more outbound network connections associated with the particular computing device, or disabling the particular computing device for an amount of time.

2. The method of claim 1, wherein:

the data movement profile includes an amount of data transferred during the particular time period, the deviation amount specifies a percentage deviation from the amount of data transferred that will trigger the data movement rule, and determining that the data movement violates the data movement rule comprises determining that an amount of data associated with the data movement is greater than the amount of data transferred by more than the deviation amount.

3. The method of claim 1, wherein:

the data movement profile includes a data transfer type distribution for the particular time period, the deviation amount specifies a percentage deviation from the data transfer type distribution that will trigger the data movement rule, and determining that the data movement violates the data movement rule comprises determining that an observed data transfer type distribution associated with the data movement differs from the data transfer type distribution by more than the deviation amount.

4. The method of claim 3, wherein the data transfer type distribution includes a ratio of Universal Datagram Protocol (UDP) transfers to Transmission Control Protocol (TCP) transfers.

5. The method of claim 1, wherein:

the data movement profile includes a number of simultaneous data destinations for the particular time period, the deviation amount specifies a percentage deviation from the number of simultaneous data destinations transferred that will trigger the data movement rule, and determining that the data movement violates the data movement rule comprises determining that a number of simultaneous data destinations for the particular computing device is greater than the number of simultaneous data destinations by more than the deviation amount.

6. The method of claim 1, wherein:

the data movement profile includes a data rate for the particular time period, the deviation amount specifies a percentage deviation from the data rate that will trigger the data movement rule, and determining that the data movement violates the data movement rule comprises determining that a data rate for the particular computing device is greater than the data rate by more than the deviation amount.

7. The method of claim 1, wherein detecting the data movement includes determining an amount of data being moved and determining a destination to which the data is being moved.

8. The method of claim 7, wherein determining the destination to which the data is being moved includes geo-locating an IP address to which the data is being moved.

9. The method of claim 1, wherein the data movement occurs from a private network to a public network.

10. The method of claim 1, wherein the data movement occurs from a first private network to a second private network.

11. The method of claim 1, wherein the data movement includes at least one of data being transferred from the particular computing device or data being transferred to the particular computing device.

12. A system comprising:

memory for storing data; and one or more processors operable to perform operations comprising:

determining a normal data movement profile for a particular computing device representing observed data transfer behavior over a network by the particular computing device during a particular time period, the observed data transfer behavior including messages sent and received by the particular computing device over the network monitored by a computing device different than the particular computing device, the normal data movement profile including one or more normal data movement attributes associated with the particular computing device, wherein the normal data movement attributes include values representing observed amounts of data sent and received by the computing device over the network during the particular time period;

identifying a data movement rule associated with the particular computing device, the data movement rule including a deviation amount representing a difference between an attribute of a detected data movement by the particular computing device and a corresponding normal movement attribute including a normal data movement profile for the particular computing device that represents a violation of the data movement rule, and one or more actions to take when the particular computing device deviates from the normal data movement profile by more than the deviation amount;

detecting a data movement associated with the particular computing device;

determining that the detected data movement exceeds the deviation amount included in the data movement rule relative to the normal data movement profile for the particular computing device; and performing the one or more actions associated with the data movement rule upon determining that the data movement violates the data movement rule, wherein the one or more actions include at least one of quarantining the particular computing device, generating an alert indicating that the particular computing device has violated the data movement rule, severing one or more outbound network connections associated with the particular computing device, or disabling the particular computing device for an amount of time.

13. The system of claim 12, wherein:
the data movement profile includes an amount of data transferred during the particular time period,
the deviation amount specifies a percentage deviation from the amount of data transferred that will trigger the data movement rule, and
determining that the data movement violates the data movement rule comprises determining that an amount of data associated with the data movement is greater than the amount of data transferred by more than the deviation amount.

14. The system of claim 12, wherein:
the data movement profile includes a data transfer type distribution for the particular time period,
the deviation amount specifies a percentage deviation from the data transfer type distribution that will trigger the data movement rule, and
determining that the data movement violates the data movement rule comprises determining that an observed data transfer type distribution associated with the data movement differs from the data transfer type distribution by more than the deviation amount.

15. The system of claim 14, wherein the data transfer type distribution includes a ratio of Universal Datagram Protocol (UDP) transfers to Transmission Control Protocol (TCP) transfers.

16. The system of claim 12, wherein:
the data movement profile includes a number of simultaneous data destinations for the particular time period,
the deviation amount specifies a percentage deviation from the number of simultaneous data destinations transferred that will trigger the data movement rule, and
determining that the data movement violates the data movement rule comprises determining that a number of simultaneous data destinations for the particular computing device is greater than the number of simultaneous data destinations by more than the deviation amount.

17. The system of claim 12, wherein:
the data movement profile includes a data rate for the particular time period,
the deviation amount specifies a percentage deviation from the data rate that will trigger the data movement rule, and
determining that the data movement violates the data movement rule comprises determining that a data rate for the particular computing device is greater than the data rate by more than the deviation amount.

18. A non-transitory, computer-readable medium storing instructions operable when executed to cause at least one processor to perform operations comprising:

determining a normal data movement profile for a particular computing device representing observed data transfer behavior over a network by the particular computing device during a particular time period, the observed data transfer behavior including messages sent and received by the particular computing device over the network monitored by a computing device different than the particular computing device, the normal data movement profile including one or more normal data movement attributes associated with the particular computing device, wherein the normal data movement attributes include values representing observed amounts of data sent and received by the computing device over the network during the particular time period;

identifying a data movement rule associated with the particular computing device, the data movement rule including a deviation amount representing a difference between an attribute of a detected data movement by the particular computing device and a corresponding normal movement attribute including a normal data movement profile for the particular computing device that represents a violation of the data movement rule, and one or more actions to take when the particular computing device deviates from the normal data movement profile by more than the deviation amount;

detecting a data movement associated with the particular computing device;

determining that the detected data movement exceeds the deviation amount included in the data movement rule relative to the normal data movement profile for the particular computing device; and performing the one or more actions associated with the data movement rule upon determining that the data movement violates the data movement rule, wherein the one or more actions include at least one of quarantining the particular computing device, generating an alert indicating that the particular computing device has violated the data movement rule, severing one or more outbound network connections associated with the particular computing device, or disabling the particular computing device for an amount of time.

19. The method of claim 1, wherein determining the data movement profile for the particular computing device includes a computing device different than the particular computing device monitoring messages sent and received by the particular computing device over the network.

* * * * *